July 27, 1926.

G. E. ZEILER 1,593,614

PRESS MOLD FOR GLASS ARTICLES

Filed April 6, 1922

WITNESSES

INVENTOR

Patented July 27, 1926.

1,593,614

UNITED STATES PATENT OFFICE.

GEORGE E. ZEILER, OF PITTSBURGH, PENNSYLVANIA.

PRESS MOLD FOR GLASS ARTICLES.

Application filed April 6, 1922. Serial No. 550,003.

The invention relates to press molds and it has particular relation to molds for forming hollow glass articles provided with necked-in handles or knobs formed integrally therewith.

One of the objects of the invention is to provide a mold, of the character described, that is particularly adapted for use in connection with the manufacture of hollow glass articles, such as covers for glass dishes, lamp shades and the like, which is so constructed that no unsightly seams will appear on the main body portion of the article and in which all necessary seams will be disposed in relatively inconspicuous locations where they will not detract from the appearance of the article.

Another object of the invention is to provide a mold of the character described having a single member adapted to form a seamless body portion of an article and a separate, collapsible portion for forming a necked-in knob or handle therefor which will be automatically disengaged from the handle when the article is raised from the mold.

Another object of the invention is to provide a mold of the class set forth, which embodies a supplementary portion which not only co-operates with the main portion of the mold in forming an article but which also functions to raise the article from the mold at the completion of the molding operation.

A further object of the invention is to provide a mold of the character described which comprises relatively few parts, is easily operated and which may be manufactured at relatively small expense.

With such objects in view, as well as other advantages which may be incident to the utilization of the improvements, the invention consists in the parts and combinations thereof hereinafter set forth and claimed, with the understanding that the several necessary elements constituting the same may be varied in proportion and arrangement without departing from the nature and scope of the invention.

In order to make the invention more easily understood, means are shown in the accompanying drawings, for carrying the same into practical effect, without limiting the improvements in their useful application, to the particular constructions, which for the purpose of explanation, are made the subject of illustration.

Figure 1:
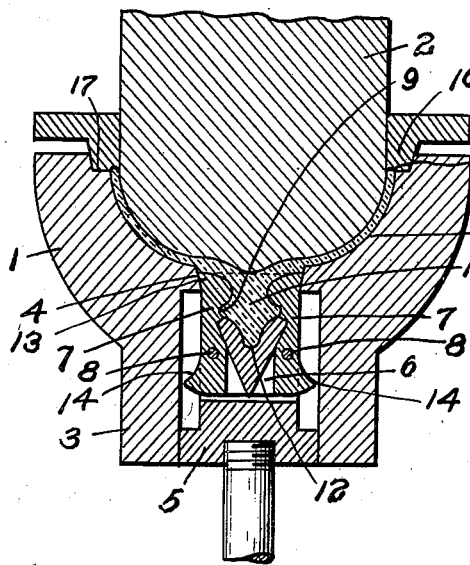
Figure 1 is a vertical sectional view of a mold embodying the invention and illustrating the parts in the positions that they occupy at the completion of the pressing operation.
Figure 2:
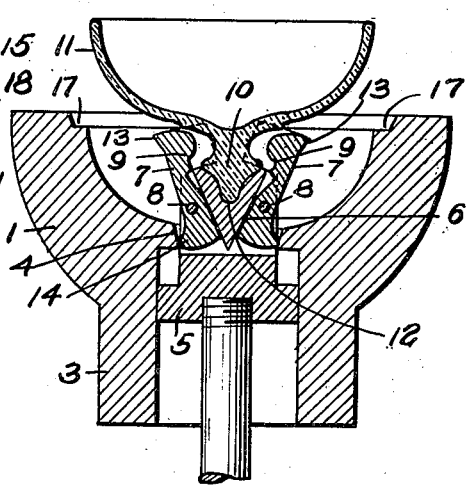
Fig. 2 is a view similar to Fig. 1 but showing the molded article partially lifted from the mold.
Figure 3:
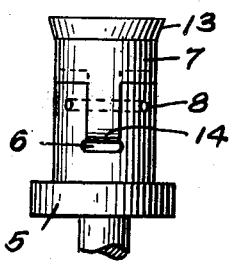
Fig. 3 is a side elevational view of the collapsible member of the mold which forms the necked-in knob portion of a glass article.

Referring to the drawings, a mold embodying the invention is shown as comprising a main body member 1 of substantially cup-shape and a vertically reciprocable co-acting plunger 2. The lower portion of the body member of the mold is provided with an integral cylindrical housing 3. The bottom of the body portion 1 of the mold is provided with an axial aperture formed with an inclined wall 4 and which communicates with the interior of the housing 3.

A vertically reciprocable plunger 5 is slidably mounted within the housing 3 and is provided with two diametrically disposed slots 6 within which two cooperating members 7 are pivotally mounted by means of pins 8, which pass through the plunger 5. The members 7 are formed with complementary recesses 9 and together constitute the two halves of a divided mold for forming a necked-in handle or knob 10 of a glass article 11. The plunger 5 may be provided with a centrally disposed recess or depression 12, such as that shown in Fig. 1, if desired, to further add to the ornamental configuration of the knob 10.

The upper extremities of the members 7 are provided with cam surfaces 13 which engage the bevelled wall 4 of the aperture in the mold, when the plunger 5 occupies its lowermost position, and are thereby maintained in their operative molding positions. The members 7 are also provided with cam surfaces 14 adjacent to their lower extremities, which engage the lower edge of the inclined wall 4 when the plunger 5 is raised to elevate the formed article from the mold and cause the members 7 to be moved about their respective pivots 8, to disengage them from the necked-in knob 10 of the article, to permit of its withdrawal from the mold.

A press ring 15 surrounds the plunger 2 and is formed with a depending annular flange 16 which is adapted to engage a recess or seat 17 formed adjacent to the upper edge of the body member 1 and co-operates therewith to entirely close the mold. The flange 16 may be provided with a groove 18 which is engaged by the plastic glass when it is displaced by the downward movement of the plunger 2, and imparts thereto the desired configuration or finish.

Figure 4:
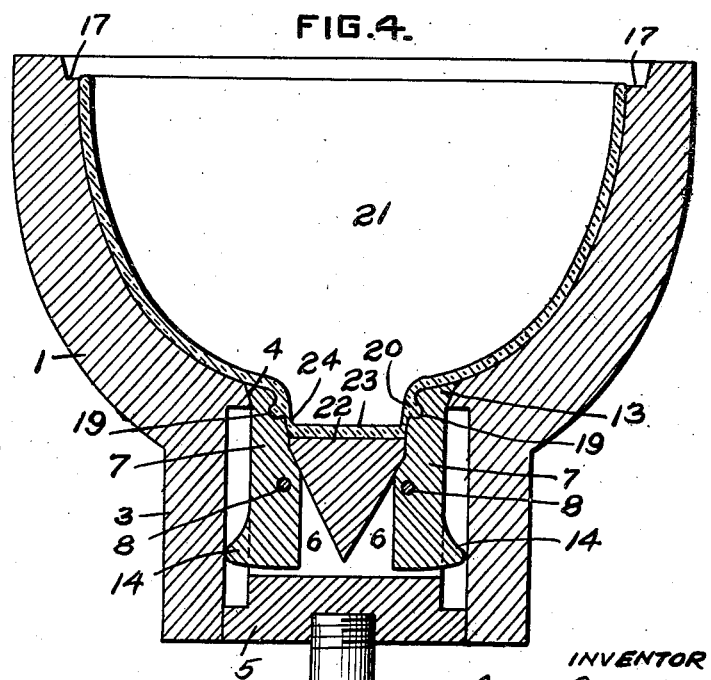
Fig. 4 is an enlarged vertical sectional view of another form of the invention in which the mold is adapted to form glass articles such as lamp shades provided with a supporting bead or marie.

In Fig. 4, there is shown another form of the invention in which the mold is proportioned to form lamp shades. In this particular construction, the members 7 are spaced farther apart and are each provided with complementary arcuate grooves or depressions 19 which co-operate with each other to form an annular bead or marie 20 adjacent to the upper portion of a shade 21. The plunger 5 is provided with a flat, centrally disposed surface 22 which co-acts with the members 7 to close the bottom of the mold.

The various parts are so proportioned that at the completion of the molding operation the shade is formed with a portion 23 which is connected to the marie 20 by a very thin wall 24. This portion may be easily broken off to form the opening at the top of the shade and the rough edge caused by the fracture, smoothed off by any suitable finishing operation.

From the foregoing it will be apparent that by the present invention a very efficient mold is provided which considerably simplifies the manufacture of glass articles and in which all necessary seams occur in relatively inconspicuous locations.

Having thus described my invention, what I claim is:

1. A mold comprising a member for forming the body portion of an article and a collapsible member movable with respect thereto for forming a necked-in extension on said body portion and for raising said article from said mold.

2. A mold comprising a main body portion and a supplementary collapsible portion adapted to form an extension on an article and to raise the article out of engagement with said body portion.

3. A mold comprising a main body portion of hollow construction having an axial opening therein and a supplementary collapsible portion movably mounted in said opening for co-operation with said body portion.

4. A mold comprising a main body portion of hollow construction having an axially disposed opening therein and a supplementary divided mold movably mounted in said opening and adapted to co-operate with said body portion to form an extension on an article and to lift the article from said body portion at the completion of the molding operation.

5. A press mold for forming a member having a laterally expanded projection and a restricted neck between the projection and the main body of the member, comprising a divided mold conforming to the configuration of the projection and neck, a member for supporting the divided mold and means for moving the divided mold and the supporting member relatively, said mold and supporting member being constructed and arranged to disengage the mold from the projection during said relative movement.

6. A mold comprising a body portion having an axial opening therein, a plunger movably mounted in said opening, a plurality of members having complementary recesses therein, movably mounted on said plunger and co-operating with said body portion to form an extension on a molded article having a restricted connecting portion, and means for moving said members out of engagement with said extension to permit of the withdrawal of the molded article from the mold.

7. A mold comprising a body portion adapted to receive a gather of plastic glass and having an axial opening in the bottom thereof, the wall of said opening being inclined to form a cam surface, a plunger movably mounted in said opening, a plurality of levers pivotally mounted on said plunger and having complementary recesses formed therein adapted to co-operate with each other to form a divided mold adapted to form a necked-in projection on the molded article, said levers being further provided with cam surfaces adjacent to each end thereof adapted to engages the inclined wall of said opening to maintain said levers in operative molding position and to disengage them from the necked-in projection of the molded article to permit of the withdrawal thereof from the mold upon the completion of the molding operation.

In testimony whereof, I have hereunto subscribed my name this 25th day of March, 1922.

GEO. E. ZEILER.